United States Patent [19]

Sayles

[11] 4,322,035
[45] Mar. 30, 1982

[54] INERT GAS GENERANTS FOR UTILIZATION WITH ROCKET MOTORS

[75] Inventor: David C. Sayles, Huntsville, Ala.

[73] Assignee: The United States of America as represented by the Secretary of the Army, Washington, D.C.

[21] Appl. No.: 400,076

[22] Filed: Oct. 2, 1973

[51] Int. Cl.$^3$ .............................................. B63H 11/00
[52] U.S. Cl. .......................... 239/265.11; 239/265.17; 239/265.25
[58] Field of Search ...................... 239/265.11, 265.14, 239/265.17, 265.27, 265.25; 60/253, 271, 265; 244/3.22

[56] References Cited

U.S. PATENT DOCUMENTS 3,028,807  4/1962  Burton et al. ........................ 244/3.13
3,091,924  6/1963  Wilder, Jr. ............................ 60/271

Primary Examiner—Donald P. Walsh
Attorney, Agent, or Firm—William G. Gapcynski; Jack W. Voigt

[57] ABSTRACT

Means for generating an inert enveloping gas for surrounding the exhaust plume of a rocket motor are disclosed along with how the enveloping gas serves to prevent the adverse interaction between the rocket motor exhaust plume and the on-board sensors when the rocket motor is operating in exoatmospheric environments. Means for generating an inert enveloping gas utilizes a combination of a T-tube rocket motor and a donut of a chemical which is a gas generant selected from hydrazine bisborane, covalent azides, tetracene, or fluorocarbon-nitroamine.

5 Claims, 6 Drawing Figures

INERT GAS GENERANTS FOR UTILIZATION WITH ROCKET MOTORS

BACKGROUND OF THE INVENTION

The exhaust plume of a rocket motor is comprised of gaseous and particulate matter produced by the burning propellant, ablation products from the rocket nozzle and motor insulation, and from other sources of the rocket motor. Any interaction between the gaseous and particulate matter of the exhaust plume with the on-board sensors would result in effects to the sensors which would detrimentally affect the accomplishment of the rocket mission. The adverse effects would result from gaseous ablation, erosion by particulate matter in the plume, depositions on the sensors, or other similar interactions. The rocket motor may either be aboard the same vehicle as the sensor, or it may be aboard some other vehicle operating in the same general vicinity.

The use of an inert gas, such as, nitrogen, helium, argon, etc. has been considered for the envelopment of the exhaust gases to provide a protective layer for on-board sensors.

The use of an inert gaseous sweep of helium or argon, either heated or cold would be impractical because of their relative low supply and the difficulties of containing them during long periods of storage.

Another problem deserves consideration when considering a gaseous species for use as the enveloping media. The problem concerns whether or not the gaseous species is optically-inactive. For example, in order to compensate for any attenuation or degradation of the detector's performance, the species which occur in the exhaust plume must be optically inactive in the detector's infrared spectral bandpass region or must be enveloped by some optically-inactive gas which interposes itself between the exhaust plume and the sensor. The optically-inactive gas would also have to be capable of wiping the deposition off the optical mirrors of the sensor. The deposition could result from the condensation or the freezing of condensible vapors, such as, water. Additionally, the plating out of particulate matter on the optical mirrors of the sensor could be another effect which an interposing, optically-inactive gas would prevent from taking place or if it did occur, the gas would then wipe off any deposition from the optical mirrors of the sensor.

Earlier considerations which relate to two types of inert gas generators did not yield favorable results to solve present problem since the two types of gas generators, sodium azide generators and heated, stored, inert gas generators, require cumbersome accessory equipment to be described. The size and weight of this accessory equipment would render these type generators impractical for the intended use. The principles of operation of these conventional gas generators are as follows: The sodium azide gas generator requires the use of a Viton-fluorocarbon binder to impart proper mechanical properties to the gas generator grain so that it will withstand the forces that it will be subjected to in use. When the sodium azide undergoes decomposition, the use of a De-Mister and a cyclone separator is required to remove the liquid sodium and the solid constituents, such as, sodium fluoride from the efflux which is produced.

The same need exists in the alternate conventional gas generator. Here the removal of the solid exhaust products of NaF and NaCl from the exhaust products of the gas generator based on the reaction of chlorine trifluoride and sodium azide to produce nitrogen gas is used. This is illustrated in the following equation:

$$ClF_3 + NaN_3 \rightarrow 6N_2 + 3NaF + NaCl$$

A necessary desirable and particularly significant concern of this disclosure demands the use of gas generants which do not exhaust inorganic solids.

Therefore, an object of this invention is to provide gas generants which do not produce inorganic solids.

Another object of this invention is to provide gas generants which have the desirable physical and chemical properties which enables them to be used without the need for accessory equipment to purify the effluent products produced by the gas generants.

A further object of this invention relates to the method of using the pertinent gas generants on board advanced ballistic missile interceptors to prevent the adverse interaction between rocket exhaust plume and the on-board sensors of the interceptors.

SUMMARY OF THE INVENTION

Of particular concern in this invention is the use of inert gas generants which are preferably in the shape of a donut. The donut of chemicals undergo thermal decomposition to produce optically-inactive products in a boundary layer which is substantially perpendicular to the centerline of the donut. The following examples illustrate the group of chemicals and the products produced from the chemicals upon thermal decomposition.

(a) Hydrazine Bisborane $$BH_3.NH_2.NH_2.BH_3 \rightarrow 2BN + 5H_2$$

(b) Covalent Azides $$H_2N.C(N_3):N.CN \rightarrow 3N_2 + 2C + H_2$$

$$HONH.C(N_3):N.CN \rightarrow H_2O + 2C + 3N_2$$

(c) Tetracene $$H_2N.C(:NH).NH.NH.N:N.C(:NH).NH.NO \rightarrow 2C + 5N_2 + H_2O + 3H_2$$

(d) Fluorocarbon-Nitroamine $$CF_2 + >CH_2.N.NO_2 \rightarrow 2CO + 2HF + N_2$$

The free carbon which is present in these exhaust plumes does not produce any adverse effects; however, if no free carbon is desired, the incorporation of an oxidant such as ammonium nitrate or octamethylene tetranitramine (HMX) could be resorted to as the means of oxidizing the carbon to carbon monoxide.

DESCRIPTION OF THE PREFERRED EMBODIMENT

This invention provides an inert gaseous media for surrounding the exhaust plume from a primary axial thruster or from auxiliary power sources. The exhaust plume without a boundary of inert gases interferes with the line of sight (LOS) to a detector or sensor. The exhaust plume tends to exert degradation effects to an infrared sensor of a system when the system is operating in exoatmospheric environments. The effects are prevented in the near-field region of the sensor. The inert gaseous media prevents the boundary layer of the exhaust plume from impinging on the detector where condensation or freezing of condensible vapors, such as, water, and the plating out of particulate matter would occur.

Figure 1:
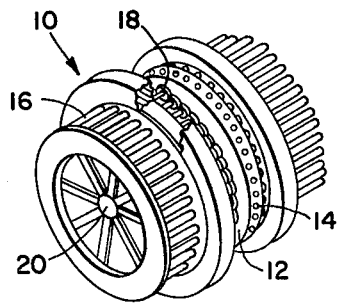
FIG. 1 shows a typical configuration, shown partially in section, for a HIT Terminal Kill Vehicle (HKV).

This invention is particularly applicable to the HIT Terminal Kill Vehicle (HKV) shown as 10 of FIG. 1. Positioning of the HKV into the intercept flight path of an incoming target is accomplished by means of a Maneuver Motor Array whose design features a group of fifty-six rocket motors of a T-tube design arranged in a hollow cylindrical cluster. Each of the fifty-six rocket motors is comprised of two rocket motor tubes which along with the through-ports and exhaust port from a T-configuration. Although the HKV, as viewed from an exploded configuration view, would show distinct parts such as torque motor firing circuits, torque motor assembly, interface electronics assembly, spin reference sensor, guidance electronics, target sensor, telemetry, maneuver motor array and igniters, battery assembly, maneuver motor firing circuits, and separate motor tubes which are interconnected through channels through an exhaust nozzle ring to an exhaust port on the periphery of the nozzle ring, only selected parts which depict the local of the invention will be illustrated in the drawing and described in conjunction with the assigned numbers of the drawing. Shown in association with the HKV 10 of FIG. 1 is a nozzle ring assembly 12 which is comprised of a plurality of spaced apart exhaust ports 14 located around the periphery thereof. A plurality of holes extend through the sides of the nozzle ring. These holes are termed through-ports. The exhaust port connects with the through-port to form a T-configuration in the nozzle ring assembly. The nozzle ring assembly has a thickness which permits a through-port to be tapped or adapted on each side for receiving a rocket motor tube which is closed on one end and threaded or adapted on the other end for fitting to the through-port. The rocket motor tube is designated by the reference numeral 16. The rocket motor tube is loaded with a suitable propellant, and the tube is provided with means for igniting (not shown) the propellant. Another rocket motor tube as described is fitted to the nozzle ring assembly on the other end of the through-port. The exhaust port 14 is connected to the through-port so that a T-configuration rocket motor results when the two rocket motor tubes are fitted to the through-port which includes a second channel that connects with a first channel which connects to the exhaust port. Actually, a T-configuration exists in the nozzle ring itself due to the construction of the through-port and associated channels connecting the exhaust port.

The present invention includes positioning a donut of chemicals 18, as shown in FIG. 1, at the inner end of the rocket motor tube. The preferred procedure is to position the donut of chemicals by fitting it on the rocket motor tube prior to the tube's being positioned in the through-port. A convenient way to secure the rocket motor tube to the through-port is to screw the previously-threaded rocket motor tube into the previously-tapped through-port. A donut of chemicals can be positioned on each tube as described, and when the propellant is ignited the heat from the propellant exhaust products causes the donut of chemicals to decompose to form a gaseous boundary layer. The gaseous boundary layer prevents the rocket motor exhaust gases which escape through the exhaust port from interacting with a target sensor which is represented by the numerical reference 20 of FIG. 1.

Figure 2:
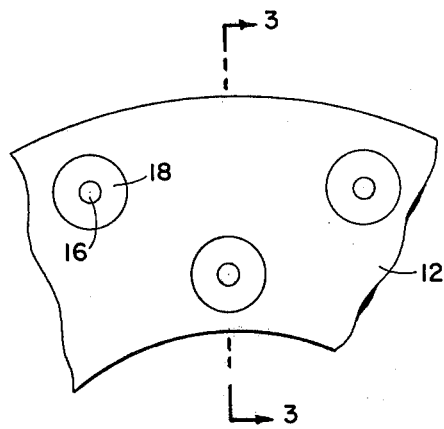
FIG. 2 shows an enlarged partial view of the side of the exhaust nozzle ring.

FIG. 2 further illustrates, by a partial and an enlarged view, the local of the invention. The donut of a chemical 18 is shown positioned on the rocket motor tube 16 which is fitted to the nozzle ring assembly 12.

Figure 3:
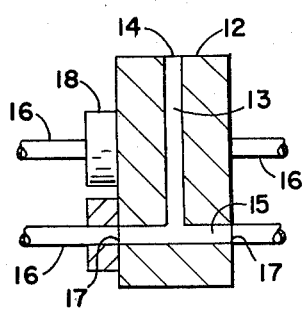
FIG. 3 is a view along line 3—3 of FIG. 2.

FIG. 3 is a view along line 3—3 of FIG. 2 which shows the exhaust nozzle ring assembly 12 with an exhaust port 14 on the periphery of the exhaust nozzle ring. The exhaust port is interconnected by a first channel 13 that is substantially perpendicular to a second channel 15 which serves to connect each of the rocket motor tubes to the exhaust port. The second channel is also referred to as a tube through-port which includes an opening 17 on each side of the nozzle ring for receiving the rocket motor tubes 16. The tube through-port is employed for transmitting the exhaust gases from each of the rocket motor tubes to the first channel which connects to the exhaust port. At least one of the rocket motor tubes is provided with means for igniting the propellant. The donut of chemical 18 is shown positioned on one side of the nozzle ring assembly.

Figure 4:
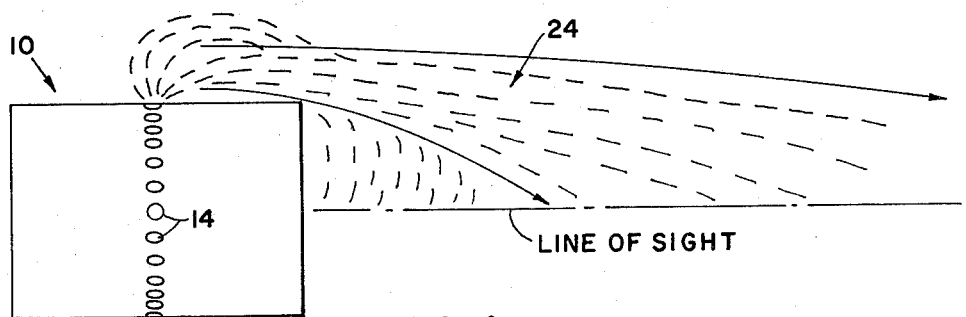
FIG. 4 is a diagrammatic view showing the exhaust plume of an HKV interfering with an on-board sensor.

FIG. 4 illustrates a HKV unit in service which is not provided with chemical donuts. The illustration depicts interference by the exhaust plume 24 with the line of sight which is outward from the target sensor. The other assigned numbers, 10 and 14, are as designated and described for FIG. 1.

Figure 5:
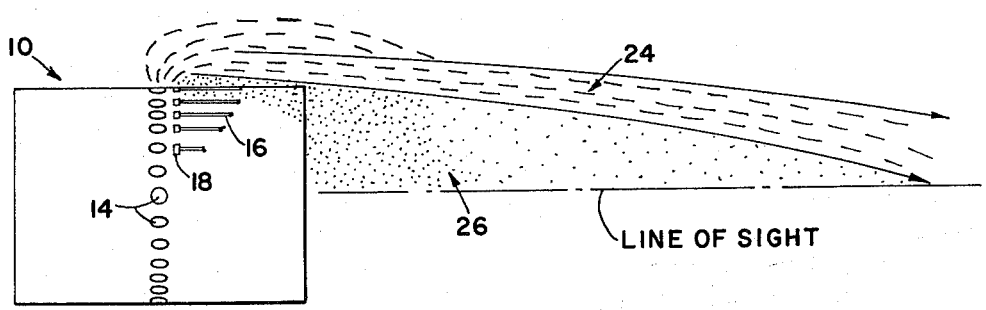
FIG. 5 is a diagrammatic view showing the exhaust plume of an HKV being deflected with a boundary of optically inactive gases.

FIG. 5 illustrates a HKV unit in service which is provided with chemical donuts which serve as the source for generating the inert enveloping gas 26 which either surrounds the exhaust plume or which changes the geometrical shape of the exhaust plume 24 while providing an optically-inactive boundary layer of gases to prevent the adverse interaction between the rocket exhaust plume and the on-board sensors. The other assigned numbers 10, 14, 16, and 18 are also as designated and described in FIG. 1.

Figure 6:
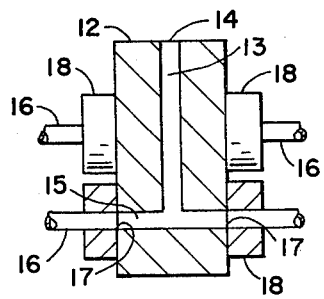
FIG. 6 is a view similar to FIG. 3 showing additional chemical donuts on the opposite side of the nozzle ring assembly.

FIG. 6 is a similar view as the view along line 3—3 of FIG. 2, except the view depicts chemical donuts 18 on each side of the nozzle ring assembly 12. The other assigned numbers, 14, 16, and 18, are as previously identified in the pertinent Figures of the drawing.

The preferred configuration of the chemical donut of this invention is achieved by molding the chemical to the required dimensions with the general configuration of a donut. The chemical donut is preferred for the HIT configuration since the donut can be fitted on the rocket motor tube just prior to the tube being fitted to a through-port. A brief description of the HIT, also referred to as HKV, and the method of utilizing a chemical donut as the source for generating an inert gas which serves as the boundary layer for the exhaust plume is covered in further detail below.

The chemical donut which is positioned on the rocket motor tube at the inner end (just outboard of the through-port into the nozzle ring) picks up sufficient heat from the hot gases passing through the tube from the burning propellant to gasify the chemical donut. The gases are propelled outwardly due to environment of operation and due to the rotation of the HKV as described in more detail below.

The gaseous products of decomposition serve as a boundary layer between the exhaust plume and the sensor surfaces. The boundary layer is substantially perpendicular to the centerline of the rocket motor tube axis. The chemical donuts can be positioned on the rocket motor tubes on both sides of the nozzle ring. This arrangement would yield almost a complete envelopment of the exhaust plume or would serve to place a boundary layer of gases almost completely around the outer edges of the exhaust plume. The positioning of chemical donuts on the rocket motor tubes, only on one side of the nozzle ring, as first described, is generally sufficient to offer protection for the target sensor which is shown as numerical figure 20 of FIG. 1.

The chemical donuts can be employed in conjunction with baffles in shaping the plume, although, baffles are generally not required.

In further describing the operation of the Maneuver Motor Array which is an integral part of the HKV, the maneuver motor design features a group of fifty-six rocket motors of T-tube design arranged in a hollow cylindrical cluster. The rocket motors deliver thrust in a direction perpendicular to the centerline of the cluster. The entire HKV assembly is spun at 25 revolutions per second by a separate torque motor. When the spinning HKV assembly reaches a point, termed as the indicated right position, final positioning of the vehicle is done by selectively firing a particular motor when the motor is in the right position. Since the Maneuver Motor Array is comprised of a plurality of T-tube motors, a plurality of firings can be accomplished for positioning the vehicle. The incremental firing capability provides a means for precise positioning of the vehicle. The chemical donuts provides the means for generating the boundary layer of optically-inactive gases so that protection is provided for the on-board sensors.

Prior to this invention, propellants for use in the HKV were restricted to non-metallized propellants because of the adverse effects of self-blinding, mutual interference between two vehicles, and optical surface contamination by plume constituents. By employing this invention, metallized propellants again become usable. Metallized propellant compositions not only offer an increase in performance over non-metallized compositions, but the incorporation of aluminum provides a mechanism for overcoming combustion instability, a problem encountered in solid propellant technology which has been solved by numerous mechanisms.

The principle of operation as disclosed and the chemical donut configuration for a particular use suggests that other configurations of the chemicals may be advantageous for other uses where a boundary layer of inert gaseous products are needed. For example, segments of a donut shape of chemicals or segments of different geometric figures could be fitted either around the rocket motor tube or around the exhaust nozzle where sufficient heat is available to cause thermal decomposition of the chemicals to form a boundary layer are other ways to make use of this invention. The time of exposure or the rocket motor burn time, and the degree of protection by inert gases are factors to be considered in designing the gas generants of this invention.

I claim:

1. An inert gas generator for use in exoatmospheric environments where an on-board sensor is employed aboard a vehicle; said inert gas generator comprising a T-tube rocket motor fitted with a donut of a chemical that decomposes when heated to yield gaseous products which are optically inactive in a detector's infrared spectral bandpass region; said T-tube rocket motor comprised of a pair of rocket motor tubes filled with propellant and with at least one of said tubes provided with means for igniting said propellant, said tubes being sealed on one end and being adapted on the other end for fitting to an exhaust nozzle ring, said donut of a chemical fitted around at least one of said tubes and said tubes diametrically fitted to said exhaust nozzle ring with said donut of a chemical being position adjacent said exhaust nozzle ring, said exhaust nozzle ring containing an exhaust port on the periphery thereof, said exhaust port being interconnected with a first channel that is substantially perpendicular to a second channel which serves to connect each of said rocket motor tubes to said exhaust port to form a T-configured rocket motor, said exhaust port serving as an exhaust nozzle through which exhaust gases are discharged to form an exhaust plume after said propellant is ignited, said exhaust gases providing thrust in a direction which is substantially perpendicular to the centerline of said rocket motor tubes with said donut of a chemical being decomposed as said exhaust gases are discharged through said rocket motor tubes, said decomposed donut of a chemical yielding said optically inactive gases in the form of a protective boundary layer which is substantially perpendicular to the centerline of said rocket motor tubes, said protective boundary layer of gases serving as a mechanism for shaping said exhaust plume to prevent adverse interactions between said exhaust plume and the on-board sensor.

2. The inert gas generator of claim 1 wherein said donut of a chemical is selected from the gas generants consisting of hydrazine bisborane, convalent azides, tetracene, and fluorocarbon-nitroamine.

3. The inert gas generator of claim 2 wherein a plurality of said T-tube rocket motors are employed with said exhaust nozzle ring to form a cylindrical cluster of said T-tube rocket motors.

4. The inert gas generator of claim 2 wherein said T-tube rocket motor is fitted with said donut of a chemical around each of said rocket motor tubes.

5. The inert gas generator of claim 4 wherein a plurality of said T-tube rocket motors are employed with said exhaust nozzle ring to form a cylindrical cluster of said T-tube rocket motors.

* * * * *